US012783686B2

(12) United States Patent
Srinivasan et al.

(10) Patent No.: US 12,783,686 B2
(45) Date of Patent: Nov. 3, 2026

(54) AI-DRIVEN VULNERABILITY MANAGEMENT FOR LEGACY MEDICAL SYSTEMS WITH ADVANCED DETECTION AND PROACTIVE MITIGATION

(71) Applicant: GE Precision Healthcare LLC, Waukesha, WI (US)

(72) Inventors: Nivedha Srinivasan, Bengaluru (IN); Mouleeswaran Kumar, Chennai (IN); Khaleel Ahamad Nadaf, Bengaluru (IN); Ashwini Vijayvergiya, Bengaluru (IN)

(73) Assignee: GE PRECISION HEALTHCARE LLC, Waukesha, WI (US)

( * ) Notice: Subject to any disclaimer, the term of this patent is extended or adjusted under 35 U.S.C. 154(b) by 30 days.

(21) Appl. No.: 18/960,590

(22) Filed: Nov. 26, 2024

(65) Prior Publication Data

US 2026/0147898 A1 May 28, 2026

(51) Int. Cl.
*G06F 21/57* (2013.01)

(52) U.S. Cl.
CPC .................................. *G06F 21/577* (2013.01)

(58) Field of Classification Search
CPC ........ G06F 21/577; G06F 21/56; G06F 21/55; H04L 63/1425; H04L 63/1433; H04L 63/1441; H04L 63/126
See application file for complete search history.

(56) References Cited

U.S. PATENT DOCUMENTS 8,752,183 B1 * 6/2014 Heiderich ............. G06F 21/577 726/25
12,367,292 B2 * 7/2025 Rao ....................... G06F 21/577
2015/0040232 A1 * 2/2015 Oliphant ............. H04L 63/0281 726/25

(Continued)

OTHER PUBLICATIONS

NVD. National Institute of Standards and Technology: National Vulnerability Database. https://nvd.nist.gov/. Last accessed Sep. 13, 2024.

(Continued)

*Primary Examiner* — Khalid M Almaghayreh
(74) *Attorney, Agent, or Firm* — Amin, Turocy & Watson, LLP

(57) ABSTRACT

One or more systems, devices, computer program products and/or computer-implemented methods of use provided herein relate to AI-driven vulnerability management for legacy medical systems. Accordingly, a system can comprise a memory that can store computer executable components. The system can further comprise a processor that can execute at least one of the computer executable components that collects information pertaining to a legacy medical system. In various aspects, at least one of the computer executable components can further leverage an artificial intelligence model and Retrieval Augmented Generation to detect a vulnerability in the legacy medical system. In various instances, the system can further generate a mitigation strategy for correcting the detected vulnerability. In various aspects, at least one of the computer executable (Continued)

components can further implement the mitigation strategy, thereby mitigating the detected vulnerability.

20 Claims, 9 Drawing Sheets

(56) References Cited

U.S. PATENT DOCUMENTS

| | | | | |
|---|---|---|---|---|
| 2023/0283629 | A1* | 9/2023 | Boyer | H04L 63/1416<br>726/22 |
| 2025/0028823 | A1* | 1/2025 | Kim | G06F 21/563 |
| 2025/0055867 | A1* | 2/2025 | Ahmed | G06F 16/2423 |
| 2025/0071130 | A1* | 2/2025 | Kim | H04L 63/126 |
| 2025/0165616 | A1* | 5/2025 | Cameron | G06F 21/552 |
| 2025/0175456 | A1* | 5/2025 | Crabtree | H04L 9/0643 |
| 2025/0294115 | A1* | 9/2025 | Kennedy | H04N 19/42 |
| 2025/0328634 | A1* | 10/2025 | Mardikar | G06F 21/55 |
| 2025/0358296 | A1* | 11/2025 | Ray | H04L 63/1416 |
| 2026/0006071 | A1* | 1/2026 | Mainardi | H04L 41/16 |
| 2026/0025396 | A1* | 1/2026 | Hussain | H04L 63/1425 |

OTHER PUBLICATIONS

IBM. Artificial intelligence (AI) cybersecurity. https://www.ibm.com/ai-cybersecurity. Last accessed Sep. 13, 2024.

Tervoort, et al. Solutions for Mitigating Cybersecurity Risks Caused by Legacy Software in Medical Devices: A Scoping Review. Digital Object Identifier 10.1109/ACCESS.2020.2984376 (2020).

* cited by examiner

200

AI-DRIVEN VULNERABILITY MANAGEMENT FOR LEGACY MEDICAL SYSTEMS WITH ADVANCED DETECTION AND PROACTIVE MITIGATION

TECHNICAL FIELD

The subject disclosure relates generally AI-driven vulnerability management for legacy medical systems, and more specifically to using advanced detection and proactive mitigation to manage vulnerabilities.

BACKGROUND

The healthcare industry is increasingly reliant on digital systems for managing patient information, diagnostics, and treatment records. However, many of these systems are aging, utilizing legacy hardware and software that struggle to meet the demands of today's cybersecurity landscape. These legacy systems, often years or even decades old, are deeply integrated into critical hospital functions, making upgrades or replacements challenging without incurring significant costs and operational downtime. Consequently, healthcare providers must continue relying on outdated technology that is vulnerable to modern cyber threats.

A critical issue with legacy systems is their exposure to known vulnerabilities. Addressing these vulnerabilities manually can be time-consuming and error-prone, especially for healthcare institutions with limited cybersecurity expertise. For many providers, this lack of specialized knowledge results in inadequate security measures, leaving electronic Protected Health Information ("ePHI") at risk.

Moreover, compliance with increasingly stringent regulations, such as those under the Health Insurance Portability and Accountability Act (HIPAA), adds further pressure on healthcare organizations to ensure that ePHI is adequately protected. These regulations now recommend rigorous security protocols to safeguard patient data, but ensuring that legacy systems are up to date with modern standards can be challenging.

Accordingly, systems or techniques that can address one or more of these technical problems can be desirable.

SUMMARY

The following presents a summary to provide a basic understanding of one or more embodiments. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, devices, systems, computer-implemented methods, apparatus or computer program products that facilitate AI-driven vulnerability management for legacy medical systems are described.

According to one or more embodiments, a system is provided. The system can comprise a non-transitory computer-readable memory that can store computer-executable components. The system can further comprise a processor that executes at least one of the computer executable components that can collect information pertaining to a legacy medical system and leverage an artificial intelligence model and Retrieval Augmented Generation to detect a vulnerability in the legacy medical system. In various aspects, the at least one of the computer executable components can further generate a mitigation strategy for correcting the detected vulnerability. In various instances, the at least one of the computer executable components can further implement the mitigation strategy, thereby mitigating the detected vulnerability.

According to one or more embodiments, a computer-implemented method is provided. In various embodiments, the computer-implemented method can comprise collecting, by a system operatively coupled to a processor, information pertaining to a legacy medical system and leverage an artificial intelligence model and Retrieval Augmented Generation to detect a vulnerability in the legacy medical system. In various aspects, the computer-implemented method can comprise generating, by the system, a mitigation strategy for correcting the detected vulnerability. In various instances, the computer-implemented method can comprise implementing, by the system, the mitigation strategy, thereby mitigating the detected vulnerability.

According to one or more embodiments, a computer program product for facilitating AI-driven vulnerability management for legacy medical systems is provided. In various embodiments, the computer program product can comprise a non-transitory computer-readable memory having program instructions embodied therewith. In various aspects, the program instructions can be executable by a processor to cause the processor to collect information pertaining to a legacy medical system and leverage an artificial intelligence model and Retrieval Augmented Generation to detect a vulnerability in the legacy medical system. In various cases, the program instructions can be further executable to cause the processor to generate a mitigation strategy for correcting the detected vulnerability. In various aspects, the program instructions can be further executable to cause the processor to implement the mitigation strategy, thereby mitigating the detected vulnerability.

DETAILED DESCRIPTION

Figure 1:
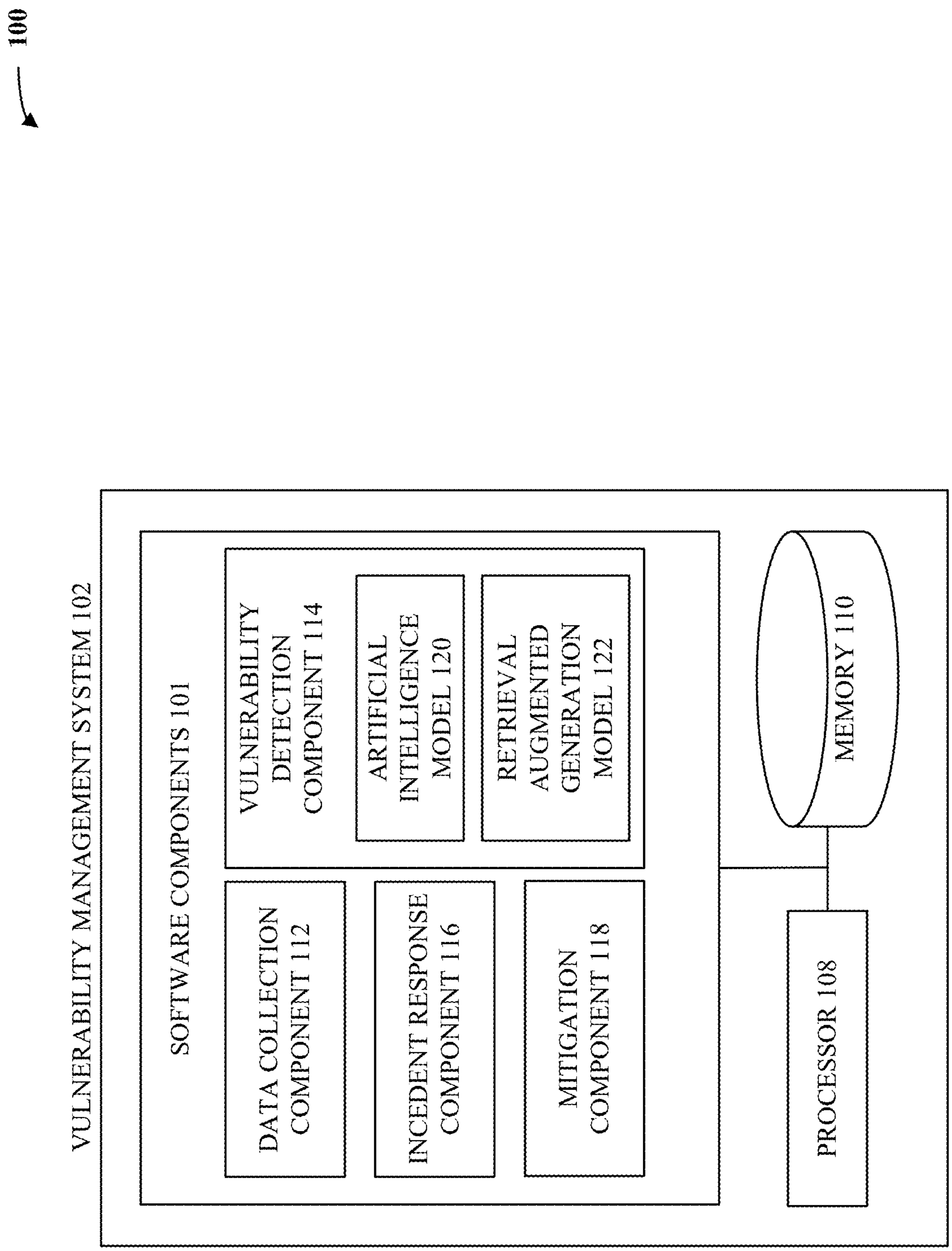
FIG. 1 illustrates a block diagram of an example, non-limiting system that facilitates AI-driven vulnerability management for legacy medical systems in accordance with one or more embodiments described herein.

The following detailed description is merely illustrative and is not intended to limit embodiments or application/uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

The healthcare industry is increasingly reliant on digital systems to manage vast amounts of sensitive patient information, including diagnostics and treatment records. These systems play a critical role in ensuring that healthcare providers can deliver timely and accurate care. However, a significant portion of the digital infrastructure used in healthcare facilities is built on outdated legacy hardware and software platforms that were designed years ago. These legacy systems, though deeply integrated into the daily operations of hospitals and other healthcare institutions, were not designed with today's cyber threats in mind. As healthcare providers continue to rely on digital systems to store and transmit electronic Protected Health Information, these older systems have become attractive targets for cybercriminals. Known vulnerabilities, especially those that have been exposed for years, remain prevalent in many legacy platforms, making them susceptible to ransomware and data breaches. Addressing these vulnerabilities manually can be arduous and error-prone, requiring significant time and expertise.

Without specialized knowledge, security measures often fail to adequately protect sensitive data, leaving patient information exposed to unauthorized access, manipulation, or theft. Manual efforts to secure legacy systems also introduce the potential for human error, thereby increasing the risk of ransomware and data breaches.

Regulations can impose strict requirements on the handling and protection of ePHI, mandating robust security protocols and risk management strategies to safeguard patient data. Failure to adhere to regulatory requirements can result in fines, reputational damage, and legal liabilities.

Upgrading or replacing legacy systems can be unduly costly and complex. Many healthcare providers operate on tight budgets, and cannot afford the financial investment required for system-wide upgrades. Even when financial resources are available, the operational downtime needed to replace or update critical systems can disrupt essential hospital functions, potentially putting patient care at risk. As a result, many healthcare providers are forced to rely on outdated vulnerable technology while struggling to maintain compliance with regulatory requirements. Without a viable path to upgrade or secure legacy systems, there is a strong need for alternative solutions to protect the digital infrastructure of healthcare institutions.

Accordingly, systems or techniques that can address one or more of these technical problems can be desirable.

Various embodiments described herein can address one or more of these technical problems. One or more embodiments described herein can include systems, computer-implemented methods, apparatus, or computer program products that can facilitate AI-driven vulnerability management for legacy medical systems. In particular, the inventors of various embodiments described herein realized that artificial intelligence systems can be leveraged to streamline and automate of vulnerability detection and mitigation in legacy medical systems. More particularly, the inventors realized that Generative Pre-trained Transformers ("GPTs") could be combined with Retrieval-Augmented Generation ("RAG") to automatically identify potential vulnerabilities by analyzing system configurations against Common Vulnerabilities and Exposures ("CVE") databases. The combination of GPTs and RAG can automatically provide detailed descriptions, impact assessments and specific mitigation strategies for each identified vulnerability (e.g., configuration changes, additional security layers, and/or protocol enhancements). Solutions can then be presented to a user for review and approval, thereby ensuring that human expertise is involved in a final decision-making process.

Accordingly, various embodiments described herein can be considered as improving vulnerability management for legacy medical systems.

Various embodiments described herein can be considered as a computerized tool (e.g., any suitable combination of computer-executable hardware or computer-executable software) that can facilitate AI-driven vulnerability management for legacy medical systems. In various aspects, such computerized tool can comprise a data collection component, a vulnerability detection component, an incident response component, a mitigation component, a training component, or a review component.

In various embodiments, the data collection component can collect information pertaining to a legacy medical system. The collected information can include healthcare software and Software of Unknown Provenance ("SOUP") components in the legacy deployment. SOUP components can include Design History File ("DHF") release documents. The collected information can further include security architecture of the healthcare software from a threat model of a deployment. The collected information can further pertain to a deployment environment (e.g., operating system version, protocol versions, hardware specifications, etc.). The collected information can be used to create a security context and develop an application-specific security context (for example, by using a RAG framework to limit the results of Large Language Models).

In various embodiments, the vulnerability detection component can leverage an artificial intelligence model and Retrieval Augmented Generation to detect a vulnerability in the legacy medical system. Using a RAG framework can ensure that only relevant vulnerabilities for the deployment are detected. The vulnerability detection component can analyze configurations of the legacy medical system against a common vulnerabilities and exposure database.

In various embodiments, the incident response component can generate a mitigation strategy for correcting the detected vulnerability. The incident response component can further generate detailed descriptions of possible solutions and mitigation strategies. The incident response component can further generate a description and impact assessment for the detected vulnerability.

In various embodiments, the mitigation component can implement the mitigation strategy.

In various embodiments, the training component can normalize and process the collected information. The training component can populate a database with the normalized information. The normalized information can be classified as at least one of: system configurations, known vulnerabilities, and mitigation strategies. The training component can utilize the information in the database to fine-tune an artificial intelligence model. The fine tuning can further comprise improving vulnerability identification and mitigation strategy generation by the artificial intelligence model.

In various embodiments, the review component can present the mitigation strategy to an administrator for approval. The mitigation strategy can include recommended code changes in software, including configuration and dependency modifications. The review component can further execute automated verification tests to ensure that software changes meet specified criteria (e.g., release readiness criteria). The review component can further initiate a software release build generation, and release a patch to legacy devices.

Various embodiments described herein can be employed to use hardware or software to solve problems that are highly technical in nature (e.g., to facilitate AI-driven vulnerability management for legacy medical systems), that are not abstract and that cannot be performed as a set of mental acts by a human. Further, some of the processes performed can be performed by a specialized computer (e.g., graphical user interfaces, data encryption, deep learning neural networks) for carrying out defined acts related to vulnerability management. For example, such defined acts can include: collecting, by a device operatively coupled to a processor, information pertaining to a legacy medical system; leveraging, by the device, an artificial intelligence model and Retrieval Augmented Generation to detect a vulnerability in the legacy medical system; generating, by the device, a mitigation strategy for correcting the detected vulnerability; and implementing, by the device, the mitigation strategy, thereby mitigating the detected vulnerability.

Such defined acts are not performed manually by humans. Indeed, neither the human mind nor a human with pen and paper can leverage an artificial intelligence model and Retrieval Augmented Generation to detect a vulnerability in the legacy medical system, generate a mitigation strategy for correcting the detected vulnerability, nor implement the mitigation strategy. Indeed, medical devices and artificial intelligence models are inherently computerized, hardware-and-software-based constructs that simply cannot be meaningfully implemented or trained in any way by the human mind without computers. A computerized tool that can electronically train an artificial intelligence model to detect a vulnerability in the legacy medical system and generate a mitigation strategy for correcting the detected vulnerability is likewise inherently computerized and cannot be implemented in any sensible, practical, or reasonable way without computers.

Moreover, various embodiments described herein can integrate into a practical application various teachings relating to AI-driven vulnerability management for legacy medical systems. As described above, when legacy medical systems are vulnerable to modern cyber threats or fail to comply with regulatory requirements, existing techniques involve manual efforts to secure the legacy systems, which introduce the potential for human error and increase the risk of ransomware and data breaches.

Various embodiments described herein can address one or more of these technical problems. In particular, the present inventors recognized that automated detection and mitigation of vulnerabilities in legacy medical systems using GPT and Retrieval Augmented Generation could improve security, compliance with regulatory requirements, operational efficiency, patient outcomes, and cost saving.

Furthermore, various embodiments described herein can control real-world tangible devices based on the disclosed teachings. For example, various embodiments described herein can electronically control real-world graphical user interfaces and can electronically train or execute real-world artificial intelligence models.

It should be appreciated that the figures and description herein provide non-limiting examples of various embodiments and are not necessarily drawn to scale.

FIG. 1 illustrates a block diagram of an example, non-limiting system 100 that can facilitate AI-driven vulnerability management for legacy medical systems. In various embodiments, the vulnerability management system 102 can comprise a processor 108 (e.g., computer processing unit, microprocessor) and a non-transitory computer-readable memory 110 that is operably or operatively or communicatively connected or coupled to the processor 108. The non-transitory computer-readable memory 110 can store computer-executable instructions which, upon execution by the processor 108, can cause the processor 108 or other components of the vulnerability management system 102 (e.g., data collection component 112, vulnerability detection component 114, incident response component 116, mitigation component 118) to perform one or more acts. In various embodiments, the non-transitory computer-readable memory 110 can store computer-executable components (e.g., data collection component 112, vulnerability detection component 114, incident response component 116, mitigation component 118), and the processor 108 can execute the computer-executable components.

In various embodiments, the vulnerability management system 102 can comprise data collection component 112. In various aspects, the data collection component 112 can collect information pertaining to a legacy medical system. The collected information can include healthcare software and Software of Unknown Provenance ("SOUP") components in the legacy deployment. SOUP components can include Design History File ("DHF") release documents. The collected information can further include security architecture of the healthcare software from a threat model of a deployment. The collected information can further pertain to a deployment environment (e.g., operating system version, protocol versions, hardware specifications, etc.). The collected information can be used to create a security context and develop an application-specific security context (for example, by using a RAG framework to limit the results of Large Language Models).

In various embodiments, the vulnerability management system 102 can comprise vulnerability detection component 114. In various aspects, the vulnerability detection component 114 can leverage artificial intelligence model 120 and Retrieval Augmented Generation model 122 to detect a vulnerability in the legacy medical system. Using a RAG framework can ensure that only relevant vulnerabilities for the deployment are detected. The vulnerability detection component 114 can analyze configurations of the legacy medical system against a common vulnerabilities and exposure database.

In various embodiments, the vulnerability management system 102 can comprise incident response component 116. Incident response component 116 can generate a mitigation strategy for correcting the detected vulnerability. The incident response component 116 can further generate detailed descriptions of possible solutions and mitigation strategies. The incident response component 116 can further generate a description and impact assessment for the detected vulnerability.

In various embodiments, the vulnerability management system 102 can comprise mitigation component 118. Mitigation component 118 can implement the mitigation strategy. Mitigation component 118 can mitigate the detected vulnerability.

Figure 2:
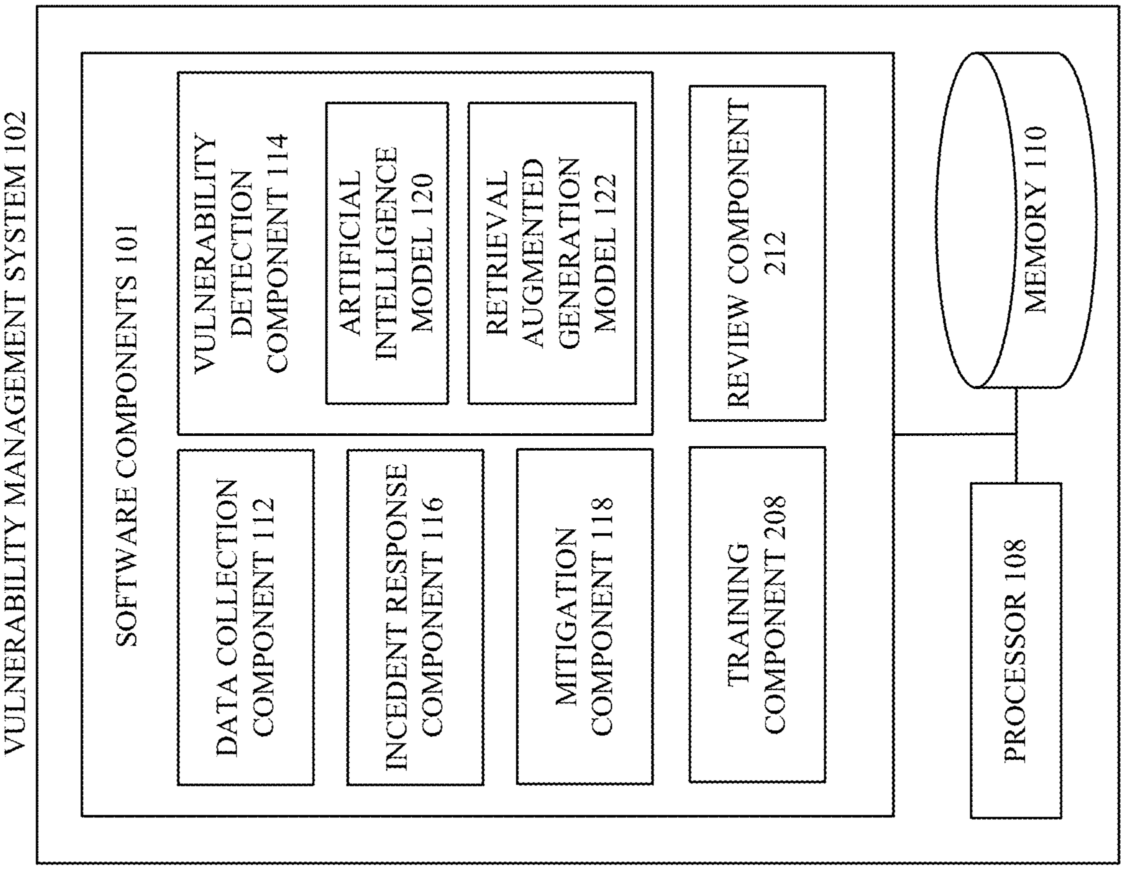
FIG. 2 illustrates a block diagram of an example, non-limiting system that facilitates AI-driven vulnerability management for legacy medical systems in accordance with one or more embodiments described herein.

FIG. 2 illustrates a block diagram of an example, non-limiting system 200 that facilitates AI-driven vulnerability management for legacy medical systems. As shown, the system 200 can, in some cases, comprise the same components as the system 100, and can further comprise a training component 208 and a review component 212.

In various embodiments, the training component 208 can normalize and process the collected information. The training component 208 can populate a database with the normalized information. The normalized information can be classified as at least one of: system configurations, known vulnerabilities, and mitigation strategies. The training component 208 can utilize the information in the database to fine-tune an artificial intelligence model. The fine tuning can further comprise improving vulnerability identification and mitigation strategy generation by the artificial intelligence model.

In various aspects, the review component 212 can present the mitigation strategy to an administrator for approval. The mitigation strategy can include recommended code changes in software, including configuration and dependency modifications. The review component 212 can further execute automated verification tests to ensure that software changes meet specified criteria (e.g., release readiness criteria). The review component 212 can further initiate a software release build generation, and release a patch to legacy devices.

Figure 3:
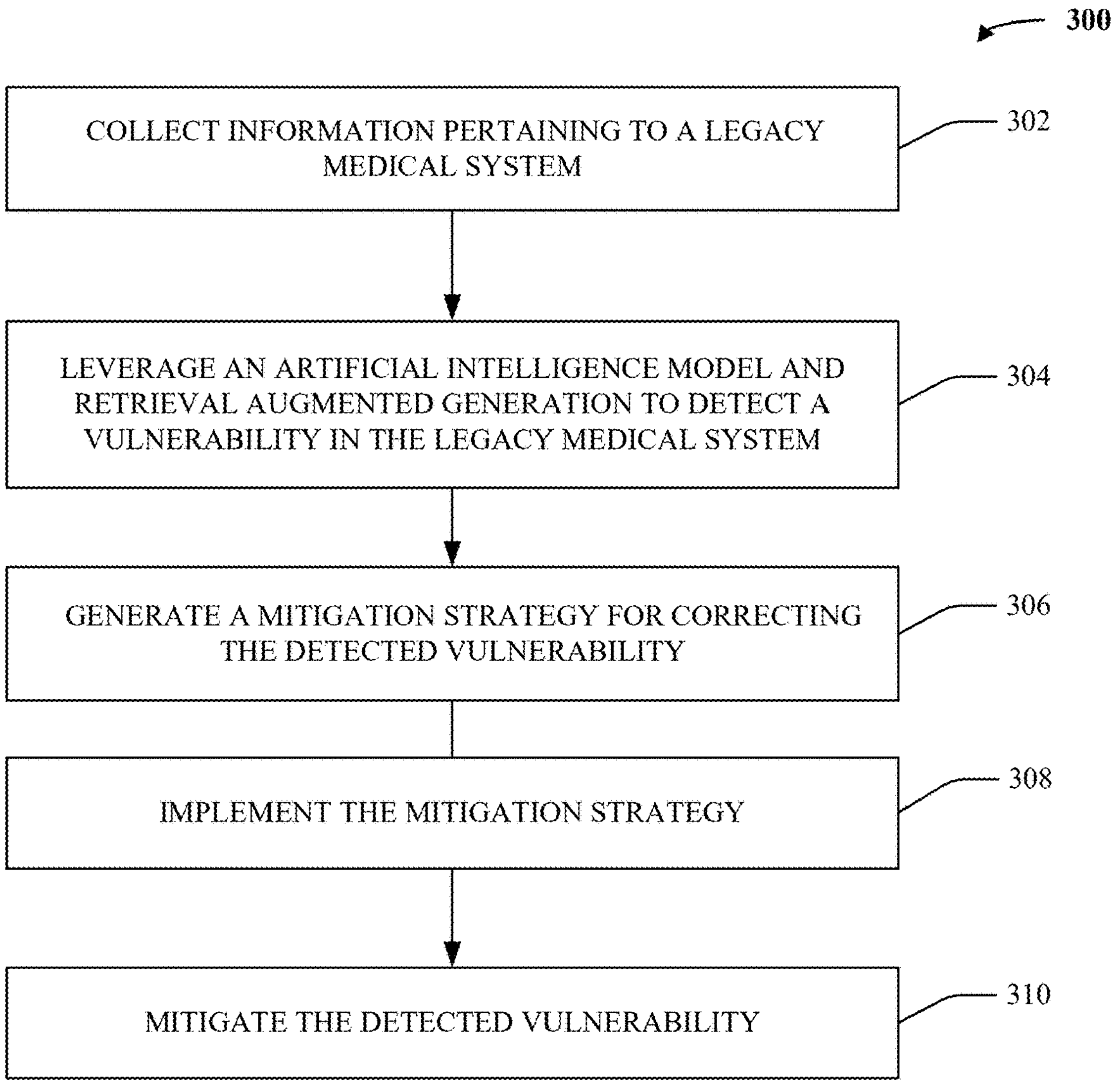
FIG. 3 illustrates a flow diagram of an example, non-limiting computer-implemented method that facilitates AI-driven vulnerability management for legacy medical systems in accordance with one or more embodiments described herein.

FIG. 3 illustrates a flow diagram of an example, non-limiting computer-implemented method 300 that can facilitate AI-driven vulnerability management for legacy medical systems in accordance with one or more embodiments described herein.

In various embodiments, act 302 can include collecting, by a device (e.g., via 112) operatively coupled to a processor (e.g., 108), information pertaining to a legacy medical system. The collected information can include healthcare software and Software of Unknown Provenance ("SOUP") components in the legacy deployment. SOUP components can include Design History File ("DHF") release documents. The collected information can further include security architecture of the healthcare software from a threat model of a deployment. The collected information can further pertain to a deployment environment (e.g., operating system version, protocol versions, hardware specifications, etc.).

In various embodiments, act 304 can include leveraging, by a device (e.g., via 114) operatively coupled to a processor (e.g., 108), an artificial intelligence model (e.g., 120) and Retrieval Augmented Generation (e.g., model 122) to detect a vulnerability in the legacy medical system.

In various embodiments, act 306 can include generating, by a device (e.g., via 116) operatively coupled to a processor (e.g., 108), a mitigation strategy for correcting the detected vulnerability.

In various embodiments, act 308 can include implementing, by a device (e.g., via 118) operatively coupled to a processor (e.g., 108), the mitigation strategy.

In various embodiments, act 310 can include mitigating, by a device operatively (e.g., via 118) coupled to a processor (e.g., 108), the detected vulnerability.

Figure 4:
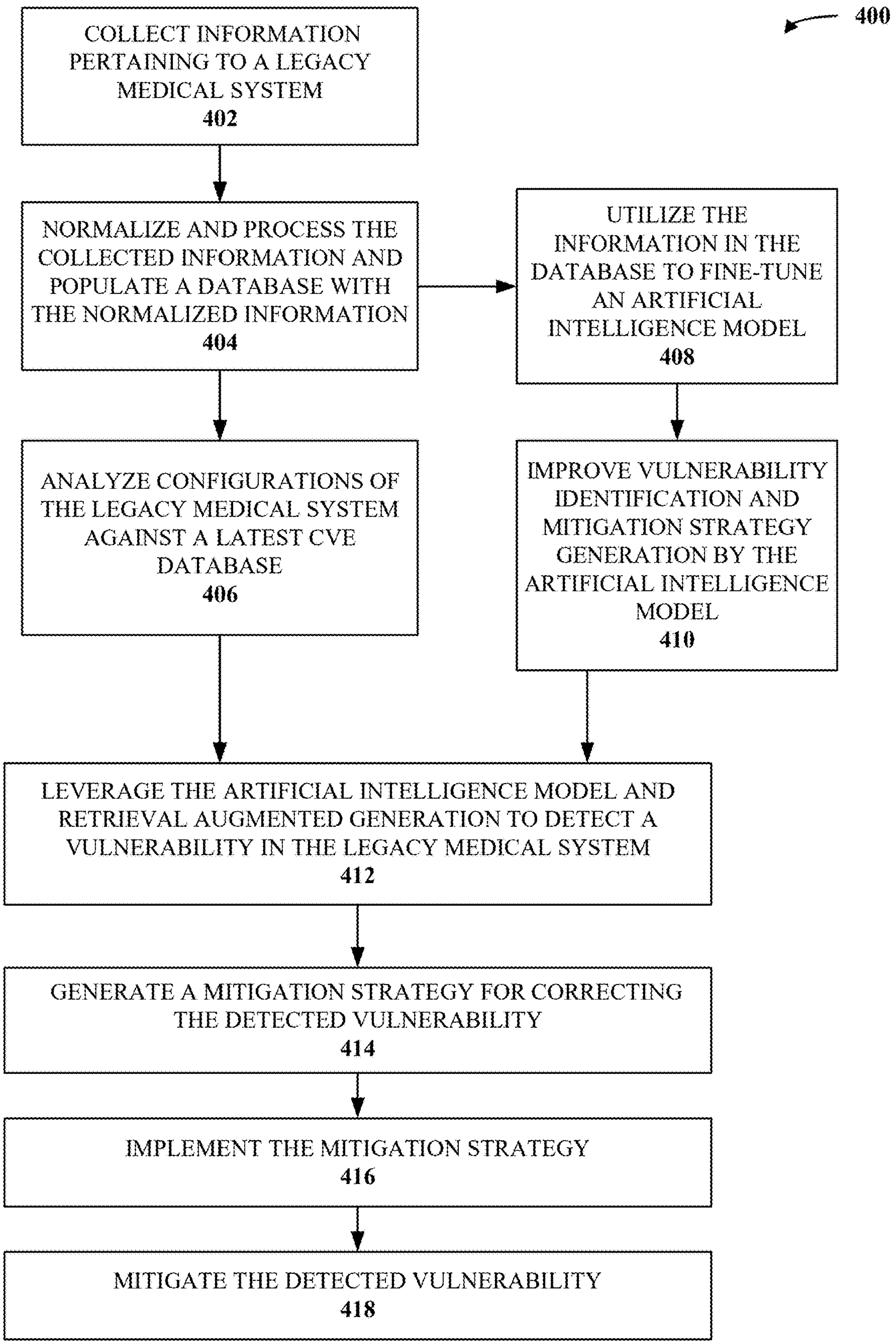
FIG. 4 illustrates a flow diagram of an example, non-limiting computer-implemented method that facilitates AI-driven vulnerability management for legacy medical systems in accordance with one or more embodiments described herein.

FIG. 4 illustrates a flow diagram of an example, non-limiting computer-implemented method 400 that can facilitate AI-driven vulnerability management for legacy medical systems in accordance with one or more embodiments described herein.

In various embodiments, act 402 can include collecting, by a device (e.g., via 112) operatively coupled to a processor (e.g., 108), information pertaining to a legacy medical system. The collected information can include healthcare software and Software of Unknown Provenance ("SOUP") components in the legacy deployment. SOUP components can include Design History File ("DHF") release documents. The collected information can further include security architecture of the healthcare software from a threat model of a deployment. The collected information can further pertain to a deployment environment (e.g., operating system version, protocol versions, hardware specifications, etc.).

In various embodiments, act 404 can include normalizing and processing, by a device (e.g., via 112) operatively coupled to a processor (e.g., 108), the collected information and populating, by the device, a database with the collected information.

In various embodiments, method 400 can proceed concurrently from act 404 to acts 406 and 408.

In some embodiments, act 406 can include analyzing, by a device (e.g., via 114) operatively coupled to a processor (e.g., 108), configurations of the legacy medical system against a latest CVE database.

In various embodiments, act 408 can include utilizing, by a device (e.g., via 114) operatively coupled to a processor (e.g., 108), the information in the database to fine-tune an artificial intelligence model (e.g., 120).

In some embodiments, act 410 can include improving, by a device (e.g., via 114) operatively coupled to a processor (e.g., 108), vulnerability identification and mitigation strategy generation by the artificial intelligence model (e.g., 120).

In various embodiments, acts 406 and 410 can concurrently proceed to act 412.

In some embodiments, act 412 can include leveraging, by a device (e.g., via 114) operatively coupled to a processor (e.g., 108), the artificial intelligence model (e.g., 120) and retrieval augmented generation (e.g., model 122) to detect a vulnerability in the legacy medical system.

In various embodiments, act 414 can include generating, by a device (e.g., via 116) operatively coupled to a processor (e.g., 108), a mitigation strategy for correcting the detected vulnerability.

In various embodiments, act 416 can include implementing, by a device (e.g., via 118) operatively coupled to a processor (e.g., 108), the mitigation strategy.

In various embodiments, act 418 can include mitigating, by a device (e.g., via 118) operatively coupled to a processor (e.g., 108), the detected vulnerability.

In a non-limiting example use case, a hospital can use legacy MRI machines running outdated operating systems. These machines can be connected to the hospital network, thereby increasing the risk of a cyberattack. Replacing or upgrading the MRI machines due to their criticality and budgetary implications may not be feasible due to their criticality and/or budgetary implications. Manual detection and patching of vulnerabilities are invariably time-consuming and require high expertise, which might not be available with the hospital. The an example, non-limiting computer-implemented method 400 can provide a solution to one or more of these issues by scanning the MRI machines automatically for vulnerabilities, and by considering OS version, protocol, and configuration data. The method 400 can include designing contextual mitigation strategies and notifying IT staff of any found vulnerabilities. Method 400 can include administrators applying patches or configuration changes that mitigate the above-identified risks without needing the full replacement of the MRI machines. Thus, the method 400 can minimize the risks of cyberattacks on the MRI machines while maintaining compliance with HIPAA and reducing expenses and downtimes.

In another non-limiting example use case, a healthcare provider can have legacy patient management systems that store sensitive patient health information (ePHI) but lack modern cybersecurity features. HIPAA and other regulations mandate strict security measures, but these legacy systems cannot meet modern security requirements without updates. The method 400 can include alerting administrators of compliance gaps and suggesting mitigation strategies, such as configuration adjustments or network isolation techniques. Thus, the method 400 can provide a solution to one or more of these issues.

In another non-limiting example use case, legacy anesthesia machines can be controlled by older software with known vulnerabilities. Disruptions or hacks to these machines could directly endanger patient lives. Upgrading can be complex, particularly where the machines are integrated with other specialized surgical equipment. The method 400 can provide a solution to one or more of these issues checking for vulnerabilities in the CVE database. If vulnerabilities are detected, method 400 can include generating a mitigation plan, including software patches and configuration adjustments, and presenting it to the hospital IT team.

In another non-limiting example use case, a network of clinics can use a mix of legacy radiology systems for diagnostics, connected to a central network. The method 400 can include continuously monitoring the network for new vulnerabilities. Whenever a new CVE affecting the systems is detected, the method 400 can include alerting administrators with actionable guidance to mitigate the vulnerability. Thus, the method 400 can provide a solution to one or more of the above-identified problems by providing constant protection of critical diagnostic systems, reducing risk of data breaches, and helping to avoid service interruptions.

In another non-limiting example use case, a medical center's legacy EMR (Electronic Medical Records) system can experience a suspected cyber intrusion. The method 400 can include assessing vulnerabilities that may have been exploited and suggesting mitigation steps. The method 400 can further include automating certain configuration changes (e.g., disabling unneeded services) and patches to block further attacks, thereby allowing administrators to secure the system while preserving data.

Figure 5:
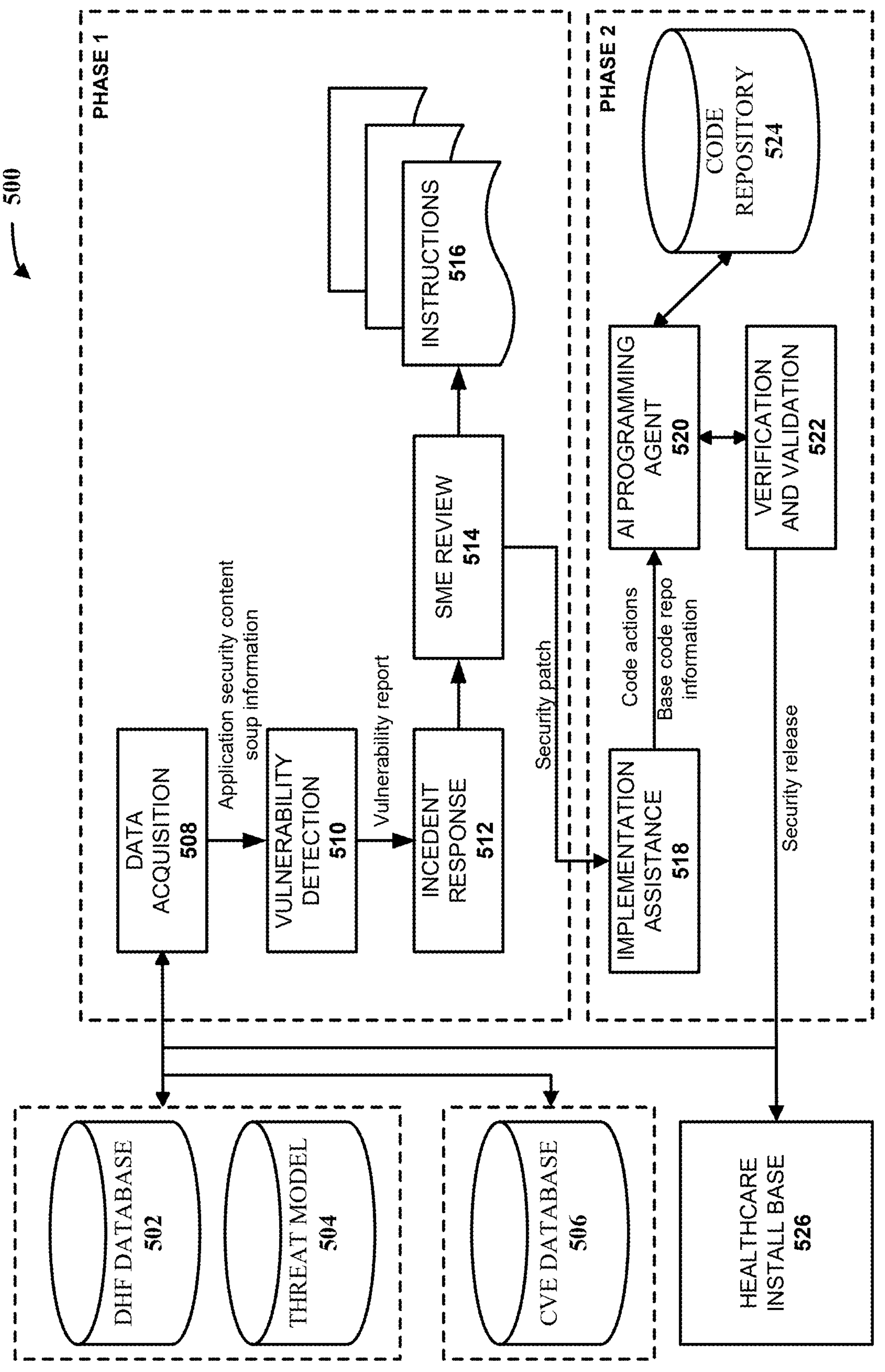
FIG. 5 illustrates an example, non-limiting system architecture 500 that can facilitate AI-driven vulnerability management for legacy medical systems in accordance with one or more embodiments described herein.

Next, FIG. 5 illustrates an example, non-limiting system architecture 500 that can facilitate AI-driven vulnerability management for legacy medical systems in accordance with one or more embodiments described herein. The DHF (Design History File) database 502 can comprise a comprehensive record that documents the design and development of a medical device or medical system (e.g., a legacy medical system), ensuring that it meets regulatory requirements and intended use. DHF database 502 can store documents, records, and artifacts generated throughout a design process, including design inputs (e.g., user needs and/or regulatory requirements), design outputs (e.g., system specifications), design verification and validation records, and/or risk analysis or mitigation plans. Threat model 504 can include a model for threat detection and mitigation (e.g., model 120 of FIG. 1 or model 600 of FIG. 6) in accordance with various embodiments herein. CVE database 506 can comprise a publicly available system that lists known cybersecurity vulnerabilities. CVE database 506 can provide a centralized resource for identifying vulnerabilities in software and hardware components used in legacy medical systems. At 508, information pertaining to a legacy medical system is collected by a device (e.g., via 112) operatively coupled to a processor (e.g., 108). At 510, vulnerabilities of the legacy medical system are detected by a device (e.g., via 114) operatively coupled to a processor (e.g., 108). At 512, an incident response strategy (e.g., mitigation strategy) can be generated by a device (e.g., via 118) operatively coupled to a processor (e.g., 108). At 514, the generated incident response can be reviewed (e.g., via review component 212) by a subject matter expert ("SME"). At 516, approved incident response instructions can be outputted to a user (e.g., via incident response component 116). At 518, the incident response strategy can be implemented (e.g., via mitigation component 118). At 520, the implemented incident response strategy can be reviewed by an artificial intelligent programming agent (e.g., via review component 212), wherein the AI programming agent evaluates effectiveness of actions taken. At 524, a final version of the incident response can be stored in a version-controlled environment. At 522, the final version of the incident response can be verified and validated (e.g., via review component 212). At 526, the final version of the incident response can be implemented.

Figure 6:
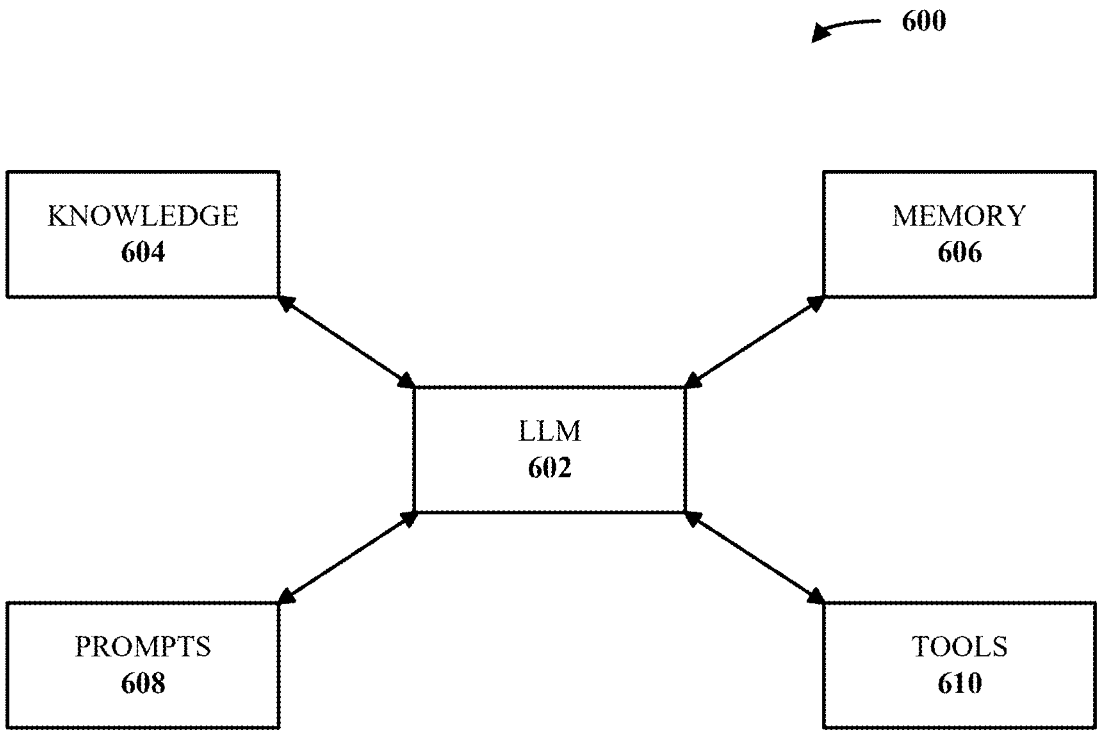
FIG. 6 illustrates an example, non-limiting system architecture 600 that can facilitate AI-driven vulnerability management for legacy medical systems in accordance with one or more embodiments described herein.

FIG. 6 illustrates an example, non-limiting system architecture 600 that can facilitate AI-driven vulnerability management for legacy medical systems in accordance with one or more embodiments described herein.

602 can comprise a large language model that can be trained on vulnerability detection with SOUP information and RAG context to generate detailed descriptions and impact assessments for identified vulnerabilities. 604 can comprise a RAG-based knowledge base of modality software, error, and incident documentation from forums or posts that can be used to train the LLM 602. 606 can comprise both short-term and long-term memory, including error remediation history. 608 can comprise auto-GTP styled self-prompts for monitoring error remediation and generating solutions based upon user requests. 610 can comprise various tools utilized by LLM 602 to facilitate AI-driven vulnerability management for legacy medical systems, such as configuration management tools and validation and verification scripts.

Figure 7:
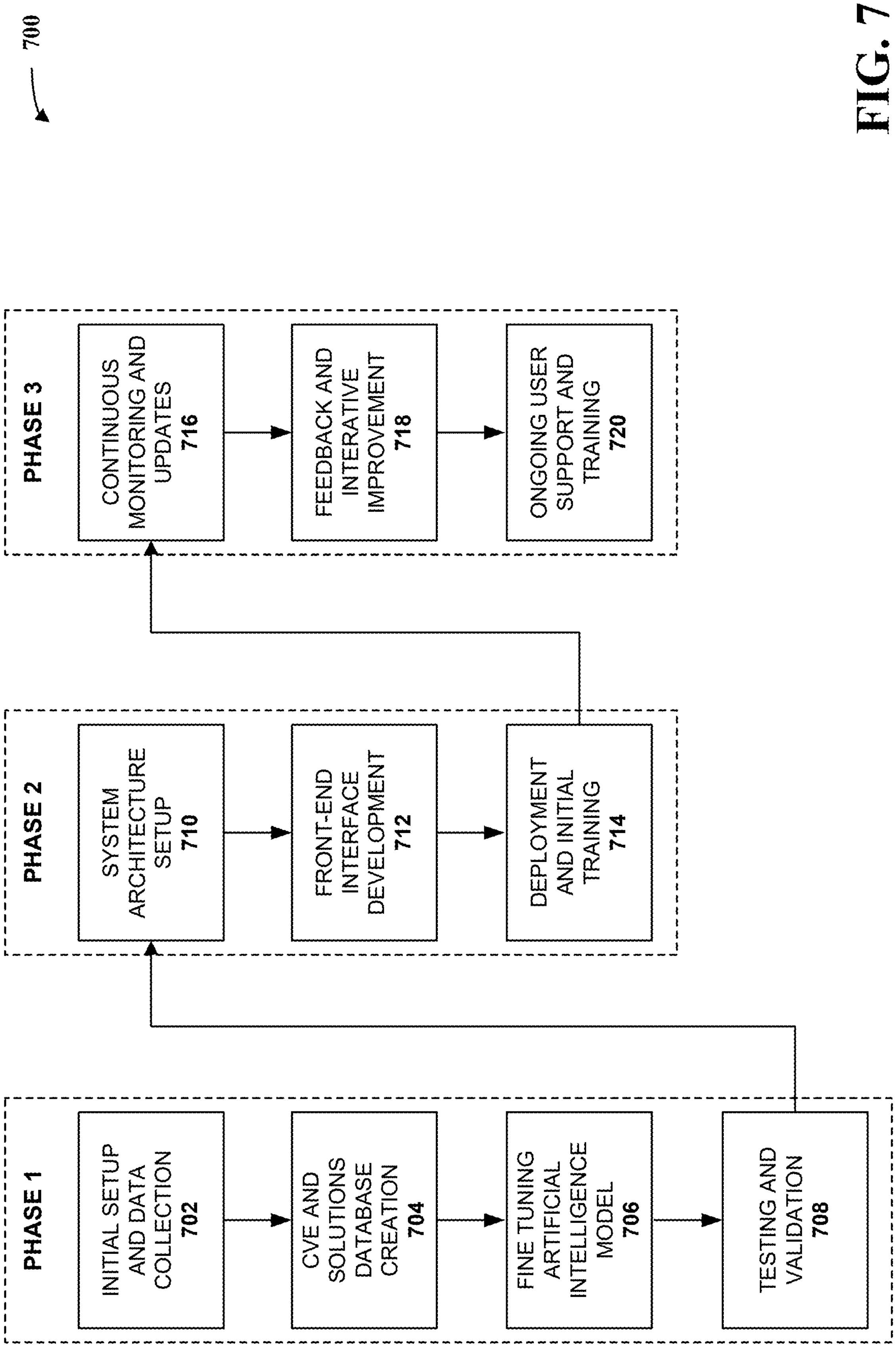
FIG. 7 illustrates a flow diagram of an example, non-limiting computer-implemented method that facilitates AI-driven vulnerability management for legacy medical systems in accordance with one or more embodiments described herein.

FIG. 7 illustrates a flow diagram of an example, non-limiting computer-implemented method 700 that can facilitate AI-driven vulnerability management for legacy medical systems in accordance with one or more embodiments described herein.

In various embodiments, act 702 can include initial setup and data collection by a device (e.g., via 112) operatively coupled to a processor (e.g., 108). The data collection can include collecting detailed information about legacy medical systems, including operating system versions, software versions, protocol versions, and hardware specification. Act 702 can further include automated tools for system scans to ensure comprehensive data collection. Act 702 can further comprise CVE database integration, thereby ensuring access to both public and private CVE feeds. Act 702 can further include establishing APIs for regular updates to maintain latest vulnerability information.

In various embodiments, act 704 can include CVE and solutions database creation by a device (e.g., via 112) operatively coupled to a processor (e.g., 108). Act 704 can include building a CVE database, which can further comprise normalizing and processing CVE data for consistency, and storing detailed descriptions, impact assessments, and remediation steps for each CVE. Act 704 can further comprise creating a database of detected vulnerabilities in legacy medical systems and corresponding mitigation that have been successfully implemented strategies (e.g., a "vulnerability and solution database"). Act 704 can further comprise creating a database of implementation guides and best practices for each solution.

In various embodiments, act 706 can include fine-tuning an artificial intelligence model (e.g., 120) by a device (e.g., via 114) operatively coupled to a processor (e.g., 108). Act 706 can further comprise compiling a dataset of system configurations, known vulnerabilities, and mitigation strategies, including annotated examples and detailed descriptions. Act 706 can include fine-tuning the artificial intelligence using the prepared dataset, with a focus on improving vulnerability identification and mitigation strategy generation. Act 706 can further comprise implementing a RAG model (e.g., 122) to pull relevant information from the CVE and vulnerability and solution database.

In various embodiments, act 708 can include testing and validating the model (e.g., 120) by a device (e.g., via 114 or 208) operatively coupled to a processor (e.g., 108). Model validation can include testing a model on a set of validation data to ensure accuracy and effectiveness. Model validation can further include evaluating the model's ability to correctly identify vulnerabilities and to suggest viable mitigation strategies. Act 708 can include receiving user feedback, such as feedback from cybersecurity experts regarding the model's performance. Act 708 can further include adjusting the model based upon the feedback.

In various embodiments, act 710 can include setting up system architecture by a device (e.g., via 114 or 208) operatively coupled to a processor (e.g., 108). Act 710 can include setting up necessary infrastructure, including servers, databases, and network configurations, and deploying microservices architecture for scalability and fault tolerance. Act 710 can further comprise integrating with existing systems, including existing hospital infrastructure, to ensure seamless data exchange and compatibility. Act 710 can also comprise ensuring secure data transmission and storage in order to comply with regulatory requirements.

In various embodiments, act 712 can include front-end interface development by a device (e.g., via 114 or 208) operatively coupled to a processor (e.g., 108). Act 712 can further comprise developing a user-friendly web-based dashboard for data input, vulnerability review, and solution approval. Act 712 can also include implementing features for displaying detailed vulnerability descriptions, impact assessments, and proposed mitigation strategies. Act 712 can comprise providing tools for users to annotate specific vulnerabilities and provide feedback on proposed solutions, and also ensuring that an interface supports easy navigation and interaction for both technical and non-technical users.

In various embodiments, act 714 can include deployment and initial training by a device (e.g., via 114 or 208) operatively coupled to a processor (e.g., 108). Act 714 can comprise deploying a completed system, ensuring that all components are operational and integrated, and conducting an initial training session for users to familiarize them with the system and its functionalities. Act 714 can further include initial data ingestion with legacy medical systems, populating the system with real world data, running initial vulnerability assessments and presenting findings for review and approval.

In various embodiments, act 716 can include continuous monitoring and updating by a device (e.g., via 208 or 212) operatively coupled to a processor (e.g., 108). Act 716 can comprise updating a CVE database with the latest vulnerabilities and mitigation strategies, and updating the Vulnerability Detected with Implemented Solutions database with new real-world implementations. Act 716 can further comprise implementing monitoring tools to track system performance and detect issues, and generating regular reports on vulnerability assessment statuses and mitigation efforts.

In various embodiments, act 718 can include receiving feedback and iteratively improving the system by a device (e.g., via 208 or 212) operatively coupled to a processor (e.g., 108). Act 718 can include collecting user feedback on the accuracy and relevance of vulnerability assessments and mitigation strategies, and incorporating the feedback into the system to improve artificial intelligence models and overall system performance. Act 718 can further comprise periodically retraining artificial intelligence models (e.g., 120) using new data and feedback to enhance accuracy and effectiveness, and implementing continuous learning techniques to ensure that models are up to date with evolving cybersecurity threats.

In various embodiments, act 720 can include providing ongoing user support and training by a device (e.g., via 208 or 212) operatively coupled to a processor (e.g., 108). Act 720 can include providing helpdesk and troubleshoot services to users, providing regular training sessions and updates to keep users informed about new features and best practices. Act 720 can further comprise establishing a community platform for users to share experiences and solutions/Act 720 can also include encouraging knowledge sharing and collaboration to enhance overall security.

Figure 8:
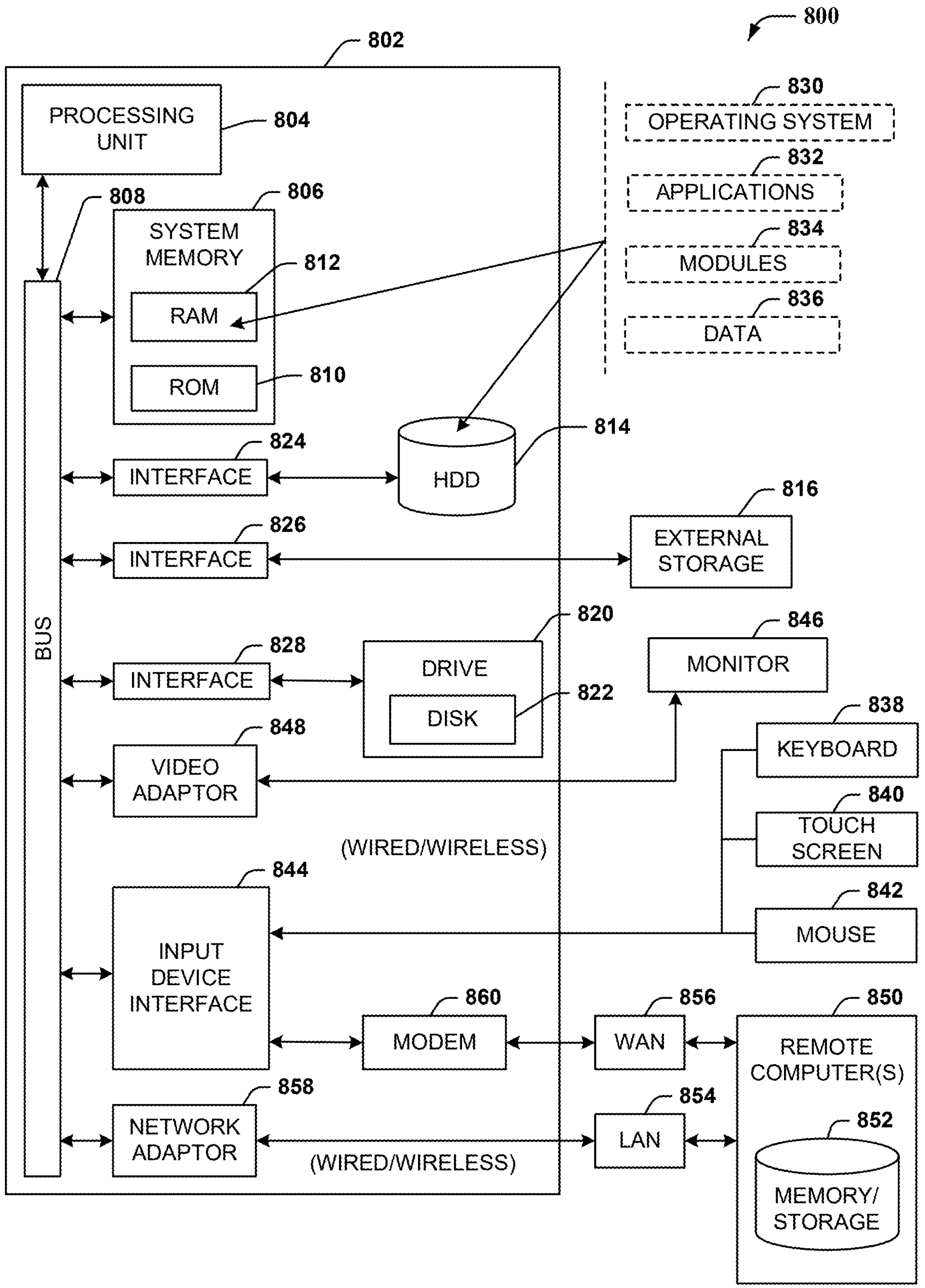
FIG. 8 illustrates a block diagram of an example, non-limiting operating environment in which one or more embodiments described herein can be facilitated.

In order to provide additional context for various embodiments described herein, FIG. 8 and the following discussion are intended to provide a brief, general description of a suitable computing environment 800 in which the various embodiments of the embodiment described herein can be implemented. While the embodiments have been described above in the general context of computer-executable instructions that can run on one or more computers, those skilled in the art will recognize that the embodiments can be also implemented in combination with other program modules or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multi-processor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 8, the example environment 800 for implementing various embodiments of the aspects described herein includes a computer 802, the computer 802 including a processing unit 804, a system memory 806 and a system bus 808. The system bus 808 couples system components including, but not limited to, the system memory 806 to the processing unit 804. The processing unit 804 can be any of various commercially available processors. Dual microprocessors and other multi-processor architectures can also be employed as the processing unit 804.

The system bus 808 can be any of several types of bus structure that can further interconnect to a memory bus (with or without a memory controller), a peripheral bus, and a local bus using any of a variety of commercially available bus architectures. The system memory 806 includes ROM 810 and RAM 812. A basic input/output system (BIOS) can be stored in a non-volatile memory such as ROM, erasable programmable read only memory (EPROM), EEPROM, which BIOS contains the basic routines that help to transfer information between elements within the computer 802, such as during startup. The RAM 812 can also include a high-speed RAM such as static RAM for caching data.

The computer 802 further includes an internal hard disk drive (HDD) 814 (e.g., EIDE, SATA), one or more external storage devices 816 (e.g., a magnetic floppy disk drive (FDD) 816, a memory stick or flash drive reader, a memory card reader, etc.) and a drive 820, e.g., such as a solid state drive, an optical disk drive, which can read or write from a disk 822, such as a CD-ROM disc, a DVD, a BD, etc. Alternatively, where a solid state drive is involved, disk 822 would not be included, unless separate. While the internal HDD 814 is illustrated as located within the computer 802, the internal HDD 814 can also be configured for external use in a suitable chassis (not shown). Additionally, while not shown in environment 800, a solid state drive (SSD) could be used in addition to, or in place of, an HDD 814. The HDD 814, external storage device(s) 816 and drive 820 can be connected to the system bus 808 by an HDD interface 824, an external storage interface 826 and a drive interface 828, respectively. The interface 824 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 802, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 812, including an operating system 830, one or more application programs 832, other program modules 834 and program data 836. All or portions of the operating system, applications, modules, or data can also be cached in the RAM 812. The systems and methods described herein can be implemented utilizing various commercially available operating systems or combinations of operating systems.

Computer 802 can optionally comprise emulation technologies. For example, a hypervisor (not shown) or other intermediary can emulate a hardware environment for operating system 830, and the emulated hardware can optionally be different from the hardware illustrated in FIG. 8. In such an embodiment, operating system 830 can comprise one virtual machine (VM) of multiple VMs hosted at computer 802. Furthermore, operating system 830 can provide runtime environments, such as the Java runtime environment or the .NET framework, for applications 832. Runtime environments are consistent execution environments that allow applications 832 to run on any operating system that includes the runtime environment. Similarly, operating system 830 can support containers, and applications 832 can be in the form of containers, which are lightweight, standalone, executable packages of software that include, e.g., code, runtime, system tools, system libraries and settings for an application.

Further, computer 802 can be enabled with a security module, such as a trusted processing module (TPM). For instance, with a TPM, boot components hash next in time boot components, and wait for a match of results to secured values, before loading a next boot component. This process can take place at any layer in the code execution stack of computer 802, e.g., applied at the application execution level or at the operating system (OS) kernel level, thereby enabling security at any level of code execution.

A user can enter commands and information into the computer 802 through one or more wired/wireless input devices, e.g., a keyboard 838, a touch screen 840, and a pointing device, such as a mouse 842. Other input devices (not shown) can include a microphone, an infrared (IR) remote control, a radio frequency (RF) remote control, or other remote control, a joystick, a virtual reality controller or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 804 through an input device interface 844 that can be coupled to the system bus 808, but can be connected by other interfaces, such as a parallel port, an IEEE 1394 serial port, a game port, a USB port, an IR interface, a BLUETOOTH® interface, etc.

A monitor 846 or other type of display device can also be connected to the system bus 808 via an interface, such as a video adapter 848. In addition to the monitor 846, a computer typically includes other peripheral output devices (not shown), such as speakers, printers, etc.

The computer 802 can operate in a networked environment using logical connections via wired or wireless communications to one or more remote computers, such as a remote computer(s) 850. The remote computer(s) 850 can be a workstation, a server computer, a router, a personal computer, portable computer, microprocessor-based entertainment appliance, a peer device or other common network node, and typically includes many or all of the elements described relative to the computer 802, although, for purposes of brevity, only a memory/storage device 852 is illustrated. The logical connections depicted include wired/wireless connectivity to a local area network (LAN) 854 or larger networks, e.g., a wide area network (WAN) 856. Such LAN and WAN networking environments are commonplace in offices and companies, and facilitate enterprise-wide computer networks, such as intranets, all of which can connect to a global communications network, e.g., the Internet.

When used in a LAN networking environment, the computer 802 can be connected to the local network 854 through a wired or wireless communication network interface or adapter 858. The adapter 858 can facilitate wired or wireless communication to the LAN 854, which can also include a wireless access point (AP) disposed thereon for communicating with the adapter 858 in a wireless mode.

When used in a WAN networking environment, the computer 802 can include a modem 860 or can be connected to a communications server on the WAN 856 via other means for establishing communications over the WAN 856, such as by way of the Internet. The modem 860, which can be internal or external and a wired or wireless device, can be connected to the system bus 808 via the input device interface 844. In a networked environment, program modules depicted relative to the computer 802 or portions thereof, can be stored in the remote memory/storage device 852. It will be appreciated that the network connections shown are example and other means of establishing a communications link between the computers can be used.

When used in either a LAN or WAN networking environment, the computer 802 can access cloud storage systems or other network-based storage systems in addition to, or in place of, external storage devices 816 as described above, such as but not limited to a network virtual machine providing one or more aspects of storage or processing of information. Generally, a connection between the computer 802 and a cloud storage system can be established over a LAN 854 or WAN 856 e.g., by the adapter 858 or modem 860, respectively. Upon connecting the computer 802 to an associated cloud storage system, the external storage interface 826 can, with the aid of the adapter 858 or modem 860, manage storage provided by the cloud storage system as it would other types of external storage. For instance, the external storage interface 826 can be configured to provide access to cloud storage sources as if those sources were physically connected to the computer 802.

The computer 802 can be operable to communicate with any wireless devices or entities operatively disposed in wireless communication, e.g., a printer, scanner, desktop or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Figure 9:
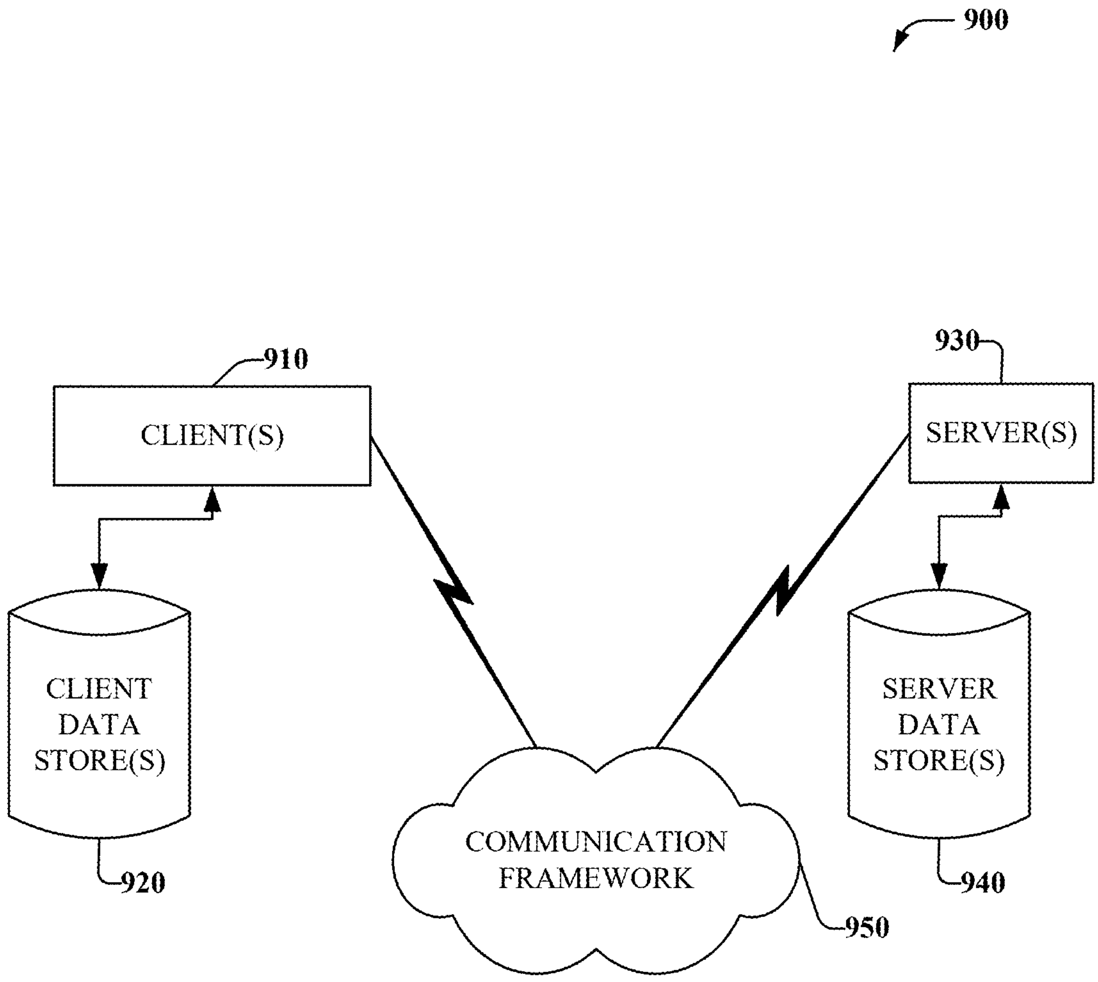
FIG. 9 illustrates an example networking environment operable to execute various implementations described herein.

FIG. 9 is a schematic block diagram of a sample computing environment 900 with which the disclosed subject matter can interact. The sample computing environment 900 includes one or more client(s) 910. The client(s) 910 can be hardware or software (e.g., threads, processes, computing devices). The sample computing environment 900 also includes one or more server(s) 930. The server(s) 930 can also be hardware or software (e.g., threads, processes, computing devices). The servers 930 can house threads to perform transformations by employing one or more embodiments as described herein, for example. One possible communication between a client 910 and a server 930 can be in the form of a data packet adapted to be transmitted between two or more computer processes. The sample computing environment 900 includes a communication framework 950 that can be employed to facilitate communications between the client(s) 910 and the server(s) 930. The client(s) 910 are operably connected to one or more client data store(s) 920 that can be employed to store information local to the client(s) 910. Similarly, the server(s) 930 are operably connected to one or more server data store(s) 940 that can be employed to store information local to the servers 930.

Various embodiments may be a system, a method, an apparatus or a computer program product at any possible technical detail level of integration. The computer program product can include a computer readable storage medium (or media) having computer readable program instructions thereon for causing a processor to carry out aspects of various embodiments. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network or a wireless network. The network can comprise copper transmission cables, optical transmission fibers, wireless transmission, routers, firewalls, switches, gateway computers or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of various embodiments can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform various aspects.

Various aspects are described herein with reference to flowchart illustrations or block diagrams of methods, apparatus (systems), and computer program products according to various embodiments. It will be understood that each block of the flowchart illustrations or block diagrams, and combinations of blocks in the flowchart illustrations or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart or block diagram block or blocks. These computer readable program instructions can also be stored in a computer readable storage medium that can direct a computer, a programmable data processing apparatus, or other devices to function in a particular manner, such that the computer readable storage medium having instructions stored therein comprises an article of manufacture including instructions which implement aspects of the function/act specified in the flowchart or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart or block diagram block or blocks.

The flowcharts and block diagrams in the Figures illustrate the architecture, functionality, and operation of possible implementations of systems, methods, and computer program products according to various embodiments. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams or flowchart illustration, and combinations of blocks in the block diagrams or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer or computers, those skilled in the art will recognize that this disclosure also can or can be implemented in combination with other program modules. Generally, program modules include routines, programs, components, data structures, etc. that perform particular tasks or implement particular abstract data types. Moreover, those skilled in the art will appreciate that various aspects can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, or a computer. By way of illustration, both an application running on a server and the server can be a component. One or more components can reside within a process or thread of execution and a component can be localized on one computer or distributed between two or more computers. In another example, respective components can execute from various computer readable media having various data structures stored thereon. The components can communicate via local or remote processes such as in accordance with a signal having one or more data packets (e.g., data from one component interacting with another component in a local system, distributed system, or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. As used herein, the term "and/or" is intended to have the same meaning as "or." Moreover, articles "a" and "an" as used in the subject specification and annexed drawings should generally be construed to mean "one or more" unless specified otherwise or clear from context to be directed to a singular form. As used herein, the terms "example" or "exemplary" are utilized to mean serving as an example, instance, or illustration. For the avoidance of doubt, the subject matter disclosed herein is not limited by such examples. In addition, any aspect or design described herein as an "example" or "exemplary" is not necessarily to be construed as preferred or advantageous over other aspects or designs, nor is it meant to preclude equivalent exemplary structures and techniques known to those of ordinary skill in the art.

The disclosure herein describes non-limiting examples. For ease of description or explanation, various portions of the herein disclosure utilize the term "each," "every," or "all" when discussing various examples. Such usages of the term "each," "every," or "all" are non-limiting. In other words, when the herein disclosure provides a description that is applied to "each," "every," or "all" of some particular object or component, it should be understood that this is a non-limiting example, and it should be further understood that, in various other examples, it can be the case that such description applies to fewer than "each," "every," or "all" of that particular object or component.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," "data storage," "database," and substantially any other information storage component relevant to operation and functionality of a component are utilized to refer to "memory components," entities embodied in a "memory," or components comprising a memory. It is to be appreciated that memory or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:

a processor that executes computer executable components stored in memory, wherein the computer executable components comprise:

a data collection component that collects deployment information pertaining to a legacy medical system, wherein the collected information comprises healthcare software information, Software of Unknown Provenance (SOUP) component information, Design History File (DHF) release document information, security architecture information from a threat model of a deployment, or deployment environment information comprising at least one of an operating system version, protocol version, or hardware specification;

a vulnerability detection component that leverages an artificial intelligence model and Retrieval Augmented Generation to detect a vulnerability in the legacy medical system by using the collected information to create a security context and develop an application-specific security context that limits results of the artificial intelligence model, wherein the vulnerability detection component analyzes configurations of the legacy medical system against a Common Vulnerabilities and Exposures (CVE) database and uses a Retrieval Augmented Generation framework to ensure that only vulnerabilities relevant to the deployment are detected;

an incident response component that generates a mitigation strategy for correcting the detected vulnerability, wherein the mitigation strategy comprises at least one of a configuration change, an additional security layer, or a protocol enhancement; and a mitigation component that implements the mitigation strategy, thereby mitigating the detected vulnerability.

2. The system of claim 1, further comprising a training component that normalizes and processes the collected information associated with the deployment-specific security context, and populates a database with the normalized information.

3. The system of claim 2, wherein the normalized information is classified as at least one of: system configurations, known vulnerabilities, mitigation strategies, Software of Unknown Provenance (SOUP) component information, Design History File (DHF) release document information, or deployment environment information.

4. The system of claim 2, wherein the training component further utilizes the information in the database to fine-tune the artificial intelligence model used by the vulnerability detection component.

5. The system of claim 4, wherein the fine-tuning further comprises improving detection of vulnerabilities relevant to the deployment-specific security context and improving generation of mitigation strategies corresponding to detected vulnerabilities by the artificial intelligence model.

6. The system of claim 5, wherein the implementing of Retrieval Augmented Generation by the vulnerability detection component further enables pulling of relevant information from the database based on the deployment-specific security context.

7. The system of claim 1, wherein the incident response component further generates detailed descriptions of possible solutions and mitigation strategies corresponding to the detected vulnerability and the deployment-specific security context.

8. The system of claim 1, wherein the system further enables automated vulnerability detection in legacy medical systems by limiting results of the artificial intelligence model based on the deployment-specific security context.

9. The system of claim 1, wherein the system uses generative artificial intelligence to automatically detect vulnerabilities relevant to the deployment-specific security context and implement vulnerability mitigation.

10. The system of claim 1, wherein the vulnerability detection component analyzes configurations of the legacy medical system against a common vulnerabilities and exposure (CVE) database to detect vulnerabilities relevant to the deployment-specific security context.

11. The system of claim 1, wherein the incident response component further generates a description and impact assessment for the detected vulnerability based on the deployment-specific security context.

12. The system of claim 1, further comprising a review component that presents the mitigation strategy generated based on the detected vulnerability and the deployment-specific security context to an administrator for approval.

13. A computer-implemented method that utilizes a processor that executes computer executable components stored in memory to perform the following acts:

collecting information pertaining to a legacy medical system, wherein the collected information comprises healthcare software information, Software of Unknown Provenance (SOUP) component information, Design History File (DHF) release document information, security architecture information from a threat model of a deployment, or deployment environment information comprising at least one of an operating system version, protocol version, or hardware specification;

leveraging an artificial intelligence model and Retrieval Augmented Generation to detect a vulnerability in the legacy medical system by using the collected information to create a security context and develop an application-specific security context that limits results of the artificial intelligence model, wherein configurations of the legacy medical system are analyzed against a Common Vulnerabilities and Exposures (CVE) database and wherein a Retrieval Augmented Generation framework is used to ensure that only vulnerabilities relevant to the deployment are detected;

generating a mitigation strategy for correcting the detected vulnerability, wherein the mitigation strategy comprises at least one of a configuration change, an additional security layer, or a protocol enhancement; and implementing the mitigation strategy in the legacy medical system, thereby mitigating the detected vulnerability.

14. The computer-implemented method of claim 13, further comprising normalizing and processing the collected information associated with the deployment-specific security context and populating a database with the normalized information.

15. The computer-implemented method of claim 13, further comprising improving detection of vulnerabilities relevant to the deployment-specific security context and improving generation of mitigation strategies corresponding to detected vulnerabilities by the artificial intelligence model.

16. The computer-implemented method of claim 15, further comprising utilizing the information in the database to fine-tune the artificial intelligence model used to detect vulnerabilities relevant to the deployment-specific security context.

17. The computer-implemented method of claim 16, wherein the fine-tuning further comprises training the artificial intelligence model to improve detection of vulnerabilities relevant to the deployment-specific security context and improve generation of mitigation strategies corresponding to detected vulnerabilities.

18. The computer-implemented method of claim 17, wherein the implementing of Retrieval Augmented Generation by the vulnerability detection component further enables the pulling of relevant information from the database based on the deployment-specific security context.

19. The computer-implemented method of claim 13, further comprising: analyzing configurations of the legacy medical system against a Common Vulnerabilities and Exposures (CVE) database to detect vulnerabilities relevant to the deployment-specific security context.

20. A non-transitory computer readable storage medium having program instructions embodied therewith, the program instructions executable by a processor to cause the processor to:

collect information pertaining to a legacy medical system, wherein the collected information comprises healthcare software information, Software of Unknown Provenance (SOUP) component information, Design History File (DHF) release document information, security architecture information from a threat model of a deployment, or deployment environment information comprising at least one of an operating system version, protocol version, or hardware specification;

leverage an artificial intelligence model and Retrieval Augmented Generation to detect a vulnerability in the legacy medical system by using the collected information to create a security context and develop an application-specific security context that limits results of the artificial intelligence model, wherein configurations of the legacy medical system are analyzed against a Common Vulnerabilities and Exposures (CVE) database and wherein a Retrieval Augmented Generation framework is used to ensure that only vulnerabilities relevant to the deployment are detected;

generate a mitigation strategy for correcting the detected vulnerability, wherein the mitigation strategy comprises at least one of a configuration change, an additional security layer, or a protocol enhancement; and implement the mitigation strategy in the legacy medical system, thereby mitigating the detected vulnerability.

* * * * *